(12) United States Patent
Nagai (10) Patent No.: US 9,876,960 B2
(45) Date of Patent: Jan. 23, 2018

(54) IMAGE PICKUP APPARATUS THAT HAS TWO PHOTOMETRIC MEANS, CONTROL METHOD THEREFOR, AND STORAGE MEDIUM

(71) Applicant: CANON KABUSHIKI KAISHA, Tokyo (JP)

(72) Inventor: Keita Nagai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/177,602

(22) Filed: Jun. 9, 2016

(65) Prior Publication Data
US 2016/0366321 A1    Dec. 15, 2016

(30) Foreign Application Priority Data

Jun. 10, 2015  (JP) .................................. 2015-117390

(51) Int. Cl.
*H04N 5/235*  (2006.01)
(52) U.S. Cl.
CPC ................................ *H04N 5/2351* (2013.01)
(58) Field of Classification Search
CPC .................................................. H04N 5/2351
See application file for complete search history.

(56) References Cited

U.S. PATENT DOCUMENTS 8,154,620 B2 *  4/2012  Hayashi ............. H04N 5/23212
                                                       348/229.1
8,169,529 B2 *  5/2012  Kajimura ........... H04N 5/23293
                                                       348/333.01

FOREIGN PATENT DOCUMENTS

JP    2006-163094 A    6/2006

* cited by examiner

*Primary Examiner* — Padma Haliyur
(74) *Attorney, Agent, or Firm* — Cowan, Liebowitz & Latman, P.C.

(57) ABSTRACT

An image pickup apparatus which is capable of shortening a time period required for photometric measurement and obtaining an accurate photometric measurement value when there has been a shift from a photometric measurement operation using an image pickup device to a photometric measurement operation using a linear photometric sensor. When there has been no shift from a photometric measurement operation by the image pickup device to a photometric measurement operation by the photometric sensor, the photometric sensor performs a first photometric measurement operation for a plurality of times, and when there has been a shift from a photometric measurement operation by the image pickup device to a photometric measurement operation by the photometric sensor, a second photometric measurement operation is performed for a smaller number of times than that of the first photometric measurement operation according to a result of photometric measurement performed by the image pickup device.

9 Claims, 7 Drawing Sheets

IMAGE PICKUP APPARATUS THAT HAS TWO PHOTOMETRIC MEANS, CONTROL METHOD THEREFOR, AND STORAGE MEDIUM

BACKGROUND OF THE INVENTION

Field of the Invention

The present invention relates to an image pickup apparatus such as a digital camera, a control method therefor, and a storage medium, and in particular to improvements in a technique to control a photometric measurement operation of an image pickup apparatus such as a digital single-lens reflex camera having two photometric means.

Description of the Related Art

For image pickup apparatuses such as digital single-lens reflex cameras, a linear photometric sensor on which the number of pixels can be increased may be used in place of a logarithmic compression photometric sensor so as to perform a face detecting function, a subject tracking function, and so forth.

The linear photometric sensor, however, has a narrower dynamic range than that of a logarithmic compression photometric sensor, and hence there is a possibility that a subject brightness cannot be accurately measured by one photometric measurement operation. During photometric measurement using an image pickup device, for example, during Live View shooting or video shooting, the power to the photometric sensor is turned off so as to reduce power consumption, and when Live View shooting or video shooting is finished, the photometric sensor is started to perform photometric measurement. At this time, a plurality of photometric measurement operations suitable for a dynamic range of the photometric sensor is required, and hence the time required for the linear photometric sensor to perform photometric measurement is long.

Therefore, there has been proposed a technique to, for a digital single-lens reflex camera that has a photometric means capable of operating when a mirror mechanism has its mirror flipped down, and a photometric measurement means capable of operating when the mirror mechanism has its mirror flipped up, efficiently control photometric measurement operations of these two photometric means. According to this proposal, when the mirror mechanism has shifted from the state of having its mirror being flipped down to the state of having its mirror flipped up, a photometric measurement operation is performed by one photometric means based on a result of photometric measurement performed by the other photometric means (see Japanese Laid-Open Patent Publication (Kokai) No. 2006-163094).

The technique described in Japanese Laid-Open Patent Publication (Kokai) No. 2006-163094 above is useful when a logarithmic compression photometric sensor is used, but with this technique, an accurate photometric measurement value may not be obtained when a linear photometric sensor is used. This is because during Live View shooting, an image which is a simulated preview of exposure is displayed on a display unit, and accordingly, accumulation in an image pickup device may be done under photometric measurement conditions suited to camera settings (f-number, shutter speed, and ISO value), not photometric measurement conditions suited to a subject brightness.

For example, when Live View shooting is performed with camera settings according to which correct exposure is obtained in a dark part of a subject with a wide brightness distribution, accumulation in an image pickup device is performed over a wide range outside a dynamic range, and when an output from the image pickup device is out of the dynamic range, an accurate photometric measurement value cannot be calculated.

In this case, when a logarithmic compression photometric sensor is used, an accurate photometric measurement value can be obtained by one photometric measurement with a wide dynamic range being made use of even if information on photometric measurement performed by an image pickup device, which is not even close to a subject brightness, is handed over. However, a linear photometric measurement senor may not obtain an accurate photometric measurement value due to its narrow dynamic range even if information on photometric measurement performed by an image pickup device is handed over.

SUMMARY OF THE INVENTION

The present invention provides an image pickup apparatus and a control method therefor, which are capable of shortening the time period required for photometric measurement and obtaining an accurate photometric measurement value when there has been a shift from photometric measurement operation using an image pickup device to photometric measurement operation using a linear photometric sensor, as well as a storage medium.

Accordingly, the present invention provides an image pickup apparatus comprising an image pickup device configured to perform photoelectric conversion of a subject image formed through a shooting optical system of a lens barrel and output an electric signal, a linear photometric sensor configured to measure an amount of light, a photometric measurement control unit configured to control a photometric measurement operation of the image pickup device and a photometric measurement operation of the photometric sensor, and a judgment unit configured to judge whether there has been a shift from a photometric measurement operation by the image pickup device to a photometric measurement operation by the photometric sensor, wherein, when the judgment unit judges that there has been no shift from a photometric measurement operation by the image pickup device to a photometric measurement operation by the photometric sensor, the photometric measurement control unit causes the photometric sensor to perform a first photometric measurement operation for a plurality of times, and when the judgment unit judges that there has been a shift from a photometric measurement operation by the image pickup device to a photometric measurement operation by the photometric sensor, the photometric measurement control unit performs a second photometric measurement operation for a smaller number of times than that of the first photometric measurement operation according to a result of photometric measurement performed by the image pickup device.

According to the present invention, when there has been a shift from photometric measurement operation using the image pickup device to photometric measurement operation using the linear photometric sensor, the time period required for photometric measurement is shortened, and an accurate photometric measurement value is obtained.

Further features of the present invention will become apparent from the following description of exemplary embodiments (with reference to the attached drawings).

DESCRIPTION OF THE EMBODIMENTS

Hereafter, an embodiment of the present invention will be described with reference to the drawings.

Figure 1:
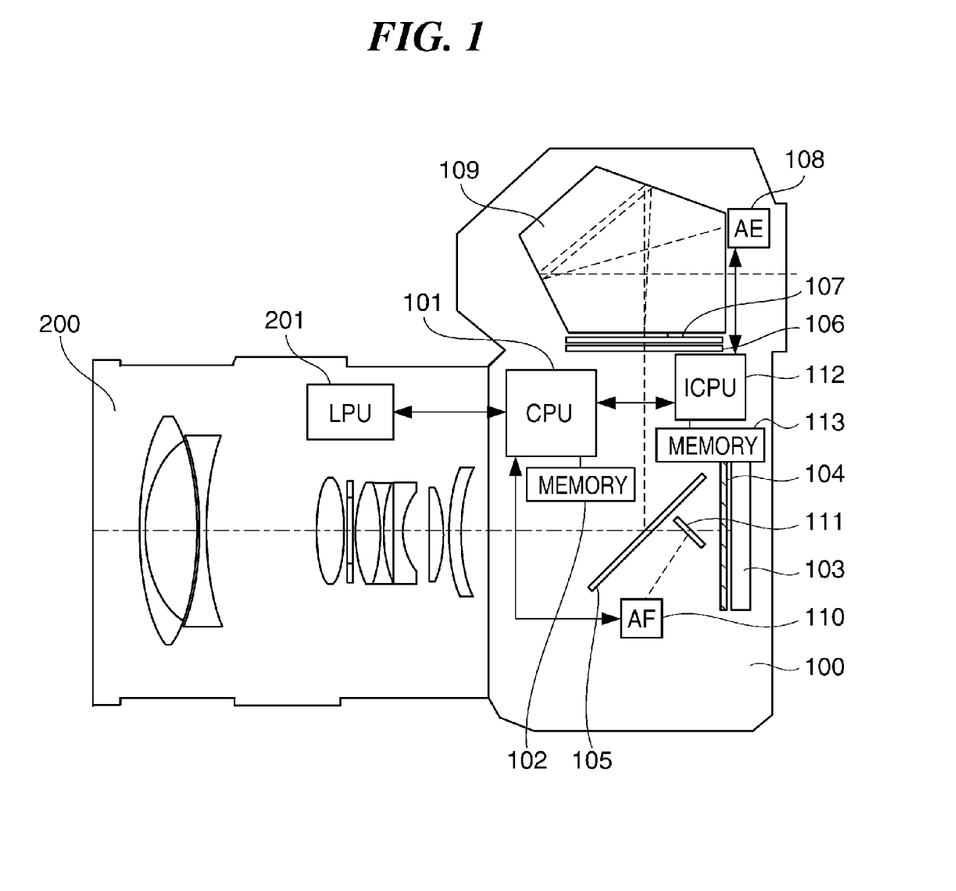
FIG. 1 is a cross-sectional view schematically showing a digital single-lens reflex camera which is an exemplary image pickup apparatus according to an embodiment of the present invention.

FIG. 1 is a cross-sectional view schematically showing a digital single-lens reflex camera which is an exemplary image pickup apparatus according to the embodiment of the present invention.

The digital single-lens reflex camera according to the present embodiment has an interchangeable lens barrel 200 that is removably mounted on a camera main body 100 as shown in FIG. 1.

The camera main body 100 has a camera CPU 101 which plays a pivotal role in controlling the overall camera, and a memory 102 such as a RAM or a ROM is connected to the camera CPU 101. At the time of observation through a viewfinder, a main mirror 105 and a sub mirror 111 enter a shooting optical path and guide a bundle of rays from a subject, which has passed through a shooting optical system of the lens barrel 200, to a focusing screen 106, and at the time of shooting, retract from the shooting optical path and guide a bundle of rays from a subject to an image pickup device 103. The main mirror 105 is comprised of a half mirror, and the sub mirror 111 reflects and guides a part of a bundle of rays from a subject, which has passed through the main mirror 105, to an AF unit 110 in a state of being flipped down and having entered the shooting optical path.

A penta dach prism 109 as well as the focusing screen 106 constitutes a viewfinder optical system and converts an image, which is formed on the focusing screen 106 by a bundle of rays from a subject, into an erected subject image. The subject image obtained as a result of the conversion is guided to a photometric sensor 108 and also observed through an optical viewfinder. A display element 107 displays an AF distance measurement frame such as PN liquid crystal and shows, for example, which position is focused on when a user peeps through the optical viewfinder.

The image pickup device 103 is comprised of a CCD sensor, a CMOS sensor, or the like. It should be noted that the image pickup device 103 according to the present embodiment includes an infrared cut filter, a low-pass filter, and so forth, but may be configured to be dispensed with them. The image pickup device 103 performs photoelectric conversion of a subject image formed via the shooting optical system of the lens barrel 200 and outputs an electric signal. The electric signal output from the image pickup device 103 is converted into an image signal by an image processing unit, not shown, and the camera CPU 101 displays the image signal obtained as a result of the conversion as a photographic image or a Live View image on a display unit, not shown, and records the same on a recording medium such as a memory card.

When shooting is not being performed, a shutter 104 shields the image pickup device 103 from light, and at the time of shooting, the shutter 104 opens to guide light from a subject, which has passed through the lens barrel 200, to the image pickup device 103. The photometric sensor 108 is comprised of an image pickup device such as a CCD sensor or a CMOS sensor and used not only to measure the amount of light but also to recognize a scene in face detection or the like and track a subject. In the present embodiment, a linear photometric sensor, for which the number of pixels is allowed to be increased, is used as the photometric sensor 108. An output characteristic of the linear photometric sensor 108 is that a subject image is converted into an electric signal linearly with respect to the amount of light incident on the photometric sensor 108. Therefore, a dynamic range of a linear photometric sensor is narrower than that of what is called a logarithmic compression photometric sensor which converts a subject image into an electric signal logarithmically with respect to the amount of incident light. It should be noted that as compared to a logarithmic compression photometric sensor, a linear photometric sensor is able to output image data with an increased number of pixels.

An ICPU 112 is a CPU for drivingly controlling the photometric sensor 108 and carrying out image processing and computations. The ICPU 112 performs computations for face detection, computations for tracking, computations for photometric measurement, and so forth. A memory 113 such as a RAM or a ROM is connected to the ICPU 112. It should be noted that in the present embodiment, the ICPU 112 exclusive to the photometric sensor 108 is used, but processes carried out by the ICPU 112 may be carried out by the camera CPU 101 instead. An LPU 201 is a CPU in the lens barrel 200 and sends, for example, camera-to-subject distance information to the camera CPU 101.

In the present embodiment, when a release button, not shown, of the camera main body 100 is, for example, pressed halfway down, a first switch, not shown, is turned on to make shooting preparations such as AF and AE, and when the release button is pressed all the way down, a second switch, not shown, is turned on to perform a shooting operation.

Figure 2:
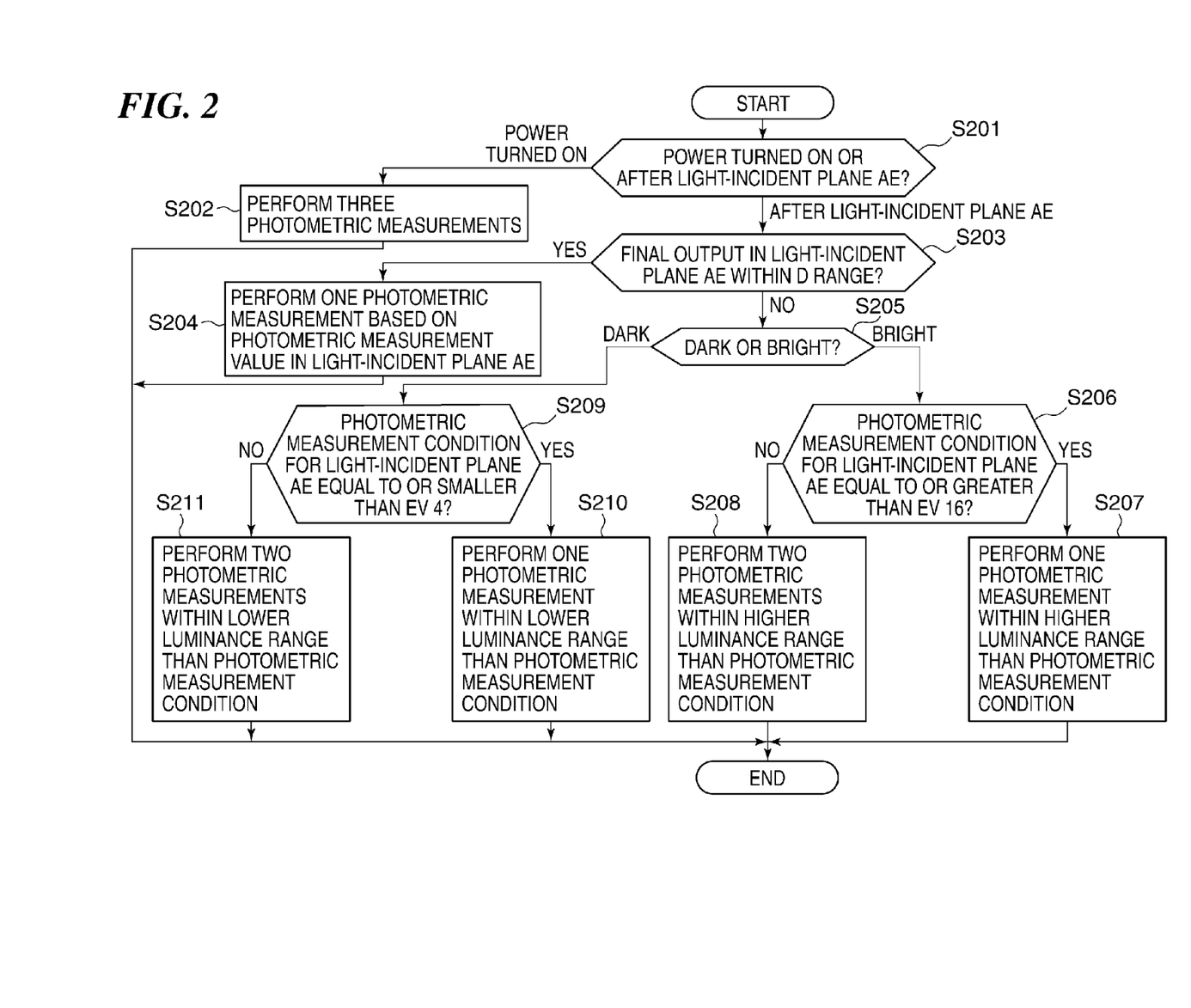
FIG. 2 is a flowchart useful in explaining a photometric measurement operation which is performed by a photometric sensor.

Referring next to FIGS. 2 to 7, a description will be given of how the digital single-lens reflex camera arranged as described above operates. FIG. 2 is a flowchart useful in explaining how photometric measurement is controlled by the ICPU 112. Processes in FIG. 2 are carried out by the ICPU 112 in accordance with programs stored in a ROM or the like of the memory 113 in the camera main body 110 and expanded into a RAM.

It should be noted that a photometric measurement operation using the photometric sensor 108 is started when the power to the camera has been turned on in a state where no photometric measurement operation has been performed by the image pickup device 103 and the photometric sensor 108, or when there has been a shift from photometric measurement operation by the image pickup device 103 (hereafter referred to as "light-incident plane AE") to photometric measurement operation by the photometric sensor 108. During light-incident plane AE in Live View shooting or the like, there is no subject light incident on the photometric sensor 108, and hence, the power to the photometric sensor 108 is turned off so as to reduce power consumption.

Referring to FIG. 2, in step S201, the ICPU 112 judges whether the power to the camera has been turned on, or there has been a shift from the light-incident plane AE to a photometric measurement operation using the photometric sensor 108. When the ICPU 112 judges that the power to the camera has been turned on, the process proceeds to step S202 so that a first photometric measurement operation can be performed, and when the ICPU 112 judges that there has been a shift from the light-incident plane AE to a photometric measurement operation using the photometric sensor 108, the process proceed to step S203 so that a second photometric measurement operation can be performed.

In the step S202, the ICPU 112 performs a plurality of (in the present embodiment, three) photometric measurement operations using the photometric sensor 108 and terminates the present process. The range of brightness that can be measured in one photometric measurement depends on a dynamic range of a photometric sensor. Thus, when the power is turned on, a linear photometric sensor with a narrow dynamic range measures a brightness of a subject by making a plurality of photometric measurements.

Figure 3:
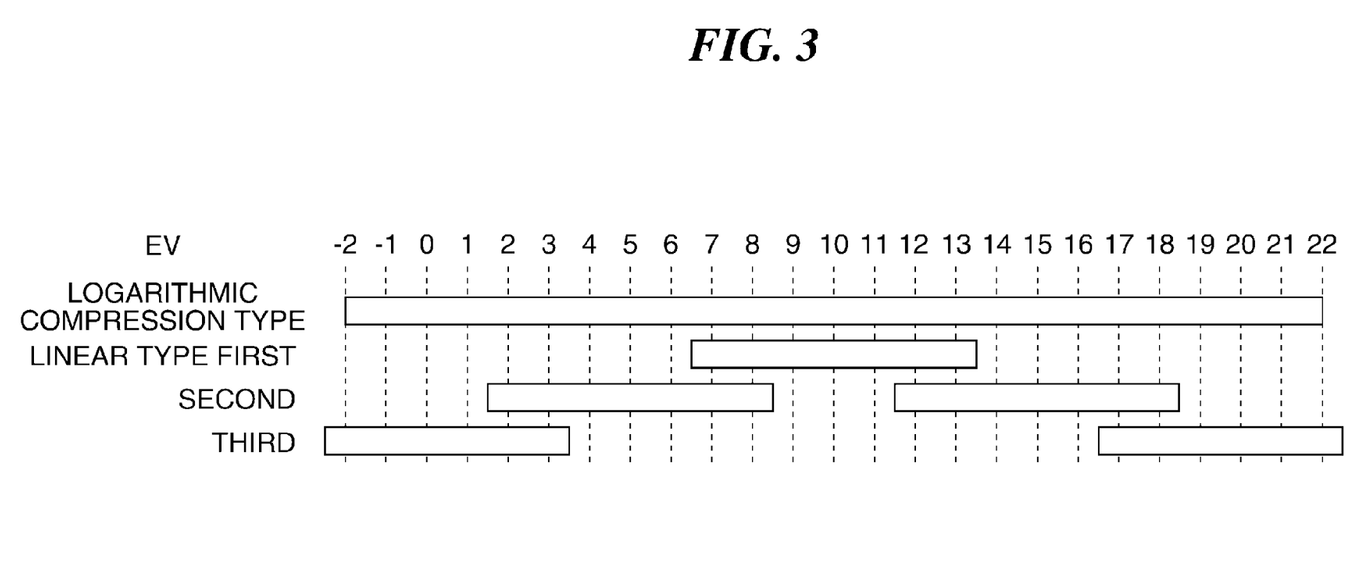
FIG. 3 is a diagram showing a comparison in photometric measurement range between a logarithmic compression photometric sensor and a linear photometric sensor.

FIG. 3 is a diagram showing a comparison in photometric measurement range between a logarithmic compression photometric sensor and a linear photometric sensor. As shown in FIG. 3, when a brightness range from EV −2 to EV 22 expressed in APEX terms is to be measured using a linear photometric sensor having a dynamic range of about seven stops, the overall brightness range is covered by making three photometric measurements when performing a photometric measurement on a subject brightness for the first time.

In the step S203, the ICPU 112 judges whether or not a final output of a photometric measurement value from the image pickup device 103 at the time of light-incident plane AE falls within the dynamic range of the image pickup device 103, and when the final output falls within the dynamic range of the image pickup device 103, the process proceeds to step S204.

Here, the dynamic range of the image pickup device 103 is relatively narrow, and hence at the time of Live View shooting with exposure simulation, a photometric measurement may be performed outside the dynamic range. In this case, an accurate photometric measurement value cannot be obtained, and hence in the step S203, when the ICPU 112 judges that the final output of a photometric measurement value from the image pickup device 103 at the time of light-incident plane AE is outside the dynamic range of the image pickup device 103, the process proceeds to step S205.

In the step S204, since the final output of a photometric measurement value from the image pickup device 103 at the time of light-incident plane AE is within the dynamic range of the image pickup device 103, the ICPU 112 determines conditions for photometric measurement using the photometric sensor 108 based on a result of photometric measurement in light-incident plane AE, carries out one photometric measurement, and terminates the present process. Here, information on a subject brightness has already been obtained by light-incident plane AE, and hence an accurate photometric measurement value is obtained by one photometric measurement.

In the step S205, since the final output of a photometric measurement value from the image pickup device 103 at the time of light-incident plane AE is outside the dynamic range of the image pickup device 103, the ICPU 112 judges whether the final output of a photometric measurement value from the image pickup device 103 is bright or dark, that is, over or under a prescribed value. When the ICPU 112 judges that the final output is over the prescribed value (for example, blown out highlights), the process proceeds to step S206, and when the ICPU 112 judges that the final output is under the prescribed value (for example, blocked up shadows), the process proceeds to step S209.

In the step S206, since the final output of a photometric measurement value from the image pickup device 103 at the time of light-incident plane AE is over the prescribed value, the number of photometric measurements is determined by case distinction according to photometric measurement conditions at the time of light-incident plane AE. A brightness value at which optimum exposure of the image pickup device 103 is obtained is known from photometric measurement conditions for light-incident plane AE, and hence a brightness range within which a subject brightness falls is estimated.

Specifically, when the final output of a photometric measurement value from the image pickup device 103 at the time of light-incident plane AE is over the prescribed value, and when a photometric measurement condition is a high brightness side, a subject brightness is on a higher brightness side than the photometric measurement condition, and a range thereof is limited. On the other hand, when the final output of a photometric measurement value from the image pickup device 103 at the time of light-incident plane AE is over the prescribed value, and when a photometric measurement condition is a low brightness side, a subject brightness is on a higher brightness side than the photometric measurement condition, and a range of a subject brightness may be wide.

In the present embodiment, a distinction is made between a case where a photometric measurement condition for light-incident plane AE is equal to or greater than EV 16 and a case where a photometric measurement condition for light-incident plane AE is smaller than EV 16. This is because the photometric sensor 108 is assumed to have a dynamic range of about seven stops, and a range where photometric measurement up to EV 22 can be done at once is EV 16. Therefore, in the step S206, when the ICPU 112 judges that the photometric measurement condition for light-incident plane AE is equal to or greater than EV 16, the process proceeds to step 207, and when not, the process proceeds to step S208.

In the step S207, the ICPU 112 performs one photometric measurement operation using the photometric sensor 108 over a higher brightness range than the photometric measurement condition for light-incident plane AE.

Figure 4:
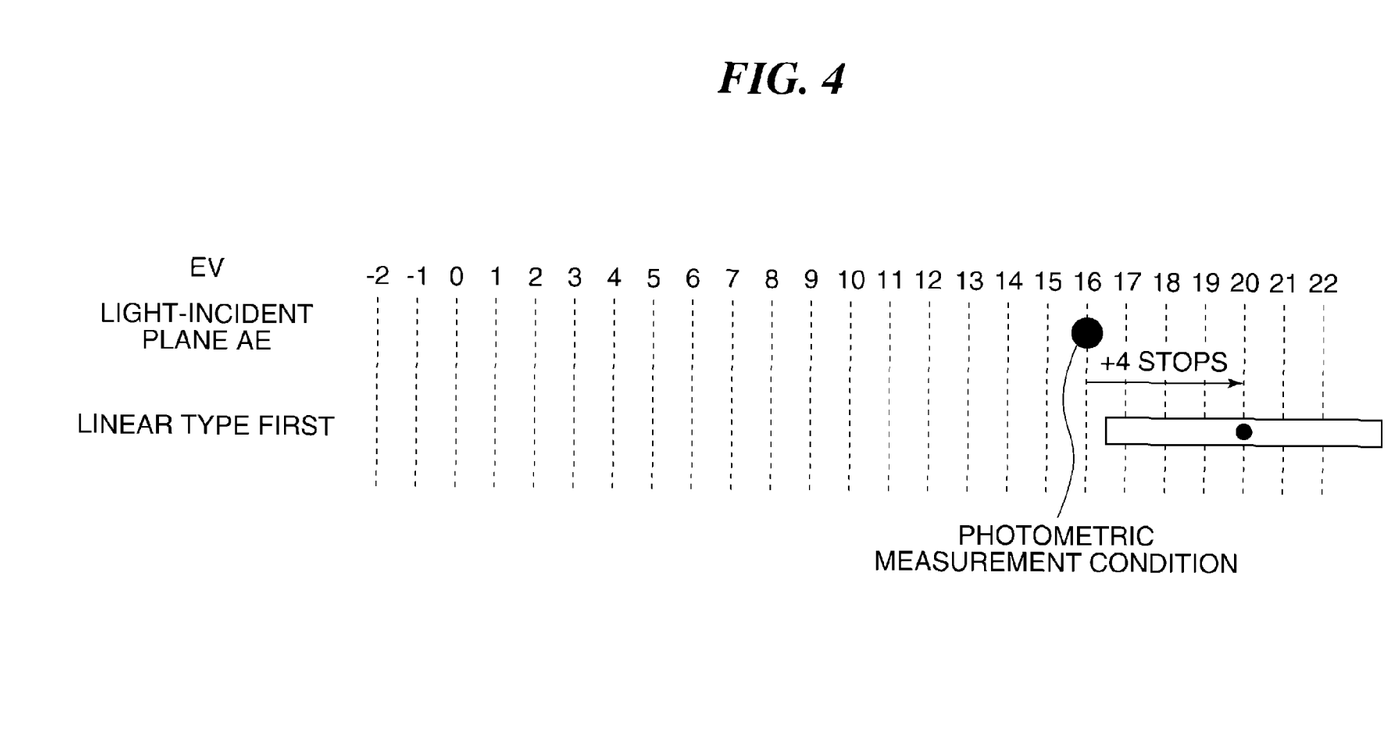
FIG. 4 is a diagram useful in explaining a photometric measurement operation which is performed in a case where a final output of a photometric measurement value from an image pickup device at the time of light-incident plane AE is over a prescribed value, and a photometric measurement condition is a high brightness side.

FIG. 4 is a diagram useful in explaining a photometric measurement operation which is performed in a case where a final output of a photometric measurement value from the image pickup device 103 at the time of light-incident plane AE is over the prescribed value, and a photometric measurement condition is a high brightness side. In this case, a subject brightness is on a higher brightness side than the photometric measurement condition, and a range thereof is limited.

In the present embodiment, assuming that the image pickup device 103 has a dynamic range of about six stops, correct exposure is obtained when the photometric measurement condition for light-incident plane AE is EV 16, and when an output from the image pickup device 103 is over the prescribed value, a subject brightness is estimated to be equal to or greater than EV 19. Therefore, in a photometric measurement operation using the photometric sensor 108, a photometric measurement condition is set to be four stops higher than that at the time of light-incident plane AE, and one photometric measurement is performed, so that a range up to EV 22 is satisfactorily covered.

In the step S208, the ICPU 112 performs two photometric measurement operations using the photometric sensor 108 over a higher brightness range than the photometric measurement condition for light-incident plane AE and terminates the present process.

Figure 5:
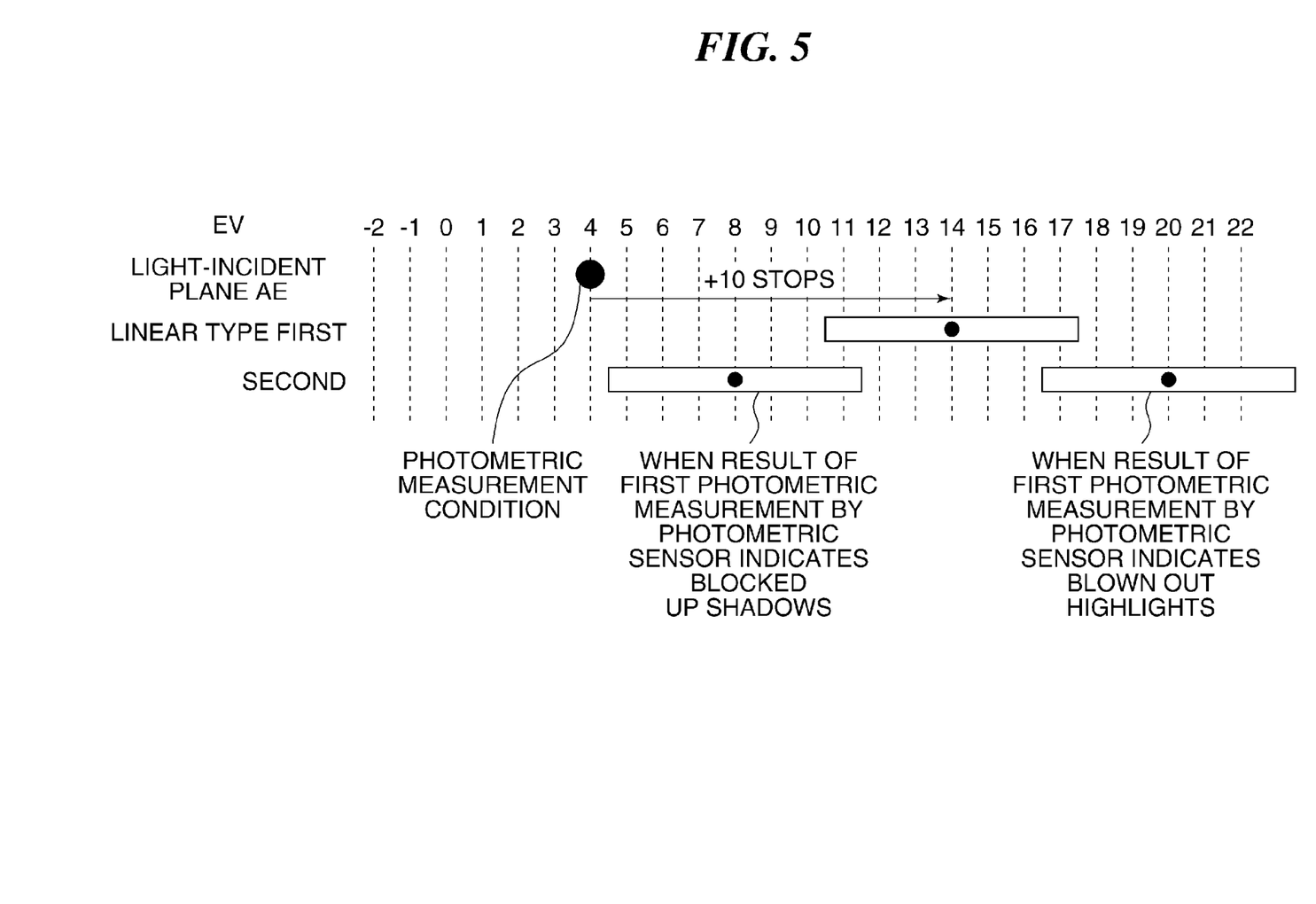
FIG. 5 is a diagram useful in explaining a photometric measurement operation which is performed in a case where a final output of a photometric measurement value from the image pickup device at the time of light-incident plane AE is over an prescribed value, and a photometric measurement condition is a low brightness side.

FIG. 5 is a diagram useful in explaining a photometric measurement operation which is performed in a case where a final output of a photometric measurement value from the image pickup device 103 at the time of light-incident plane AE is over the prescribed value, and a photometric measurement condition is a low brightness side. As shown in FIG. 5, a subject brightness is higher than the photometric measurement condition for light-incident plane AE. Therefore, in photometric measurement using the photometric sensor 108, a first photometric measurement is performed first under a photometric measurement condition that is set to be ten stops higher than that at the time of light-incident plane AE, and then, a second photometric measurement is performed based on a result of the first photometric measurement to measure a brightness of a subject.

On the other hand, in step S209, the final output of a photometric measurement value from the image pickup device 103 at the time of light-incident plane AE is under the prescribed value, and in this case as well, the number of photometric measurements is determined by case distinction according to photometric measurement conditions at the time of light-incident plane AE as with the step S206.

When the final output of a photometric measurement value from the image pickup device 103 at the time of light-incident plane AE is under the prescribed value, and when a photometric measurement condition is a low brightness side, a subject brightness is on a lower brightness side than the photometric measurement condition, and a range thereof is limited. On the other hand, when the final output of a photometric measurement value from the image pickup device 103 at the time of light-incident plane AE is under the prescribed value, and when a photometric measurement condition is a high brightness side, a range of a subject brightness may be wide.

In the present embodiment, a distinction is made between a case where a photometric measurement condition for light-incident plane AE is equal to or smaller than EV 4 and a case where a photometric measurement condition for light-incident plane AE is greater than EV 4. This is because the photometric sensor 108 is assumed to have a dynamic range of about seven stops, and a range where photometric measurement up to EV −2 can be done at once is EV 4. Therefore, in the step S209, when the ICPU 112 judges that the photometric measurement condition for light-incident plane AE is equal to or smaller than EV 4, the process proceeds to step 210, and when not, the process proceeds to step S211.

In the step S210, the ICPU 112 performs one photometric measurement operation using the photometric sensor 108 over a lower brightness range than the photometric measurement condition for light-incident plane AE.

Figure 6:
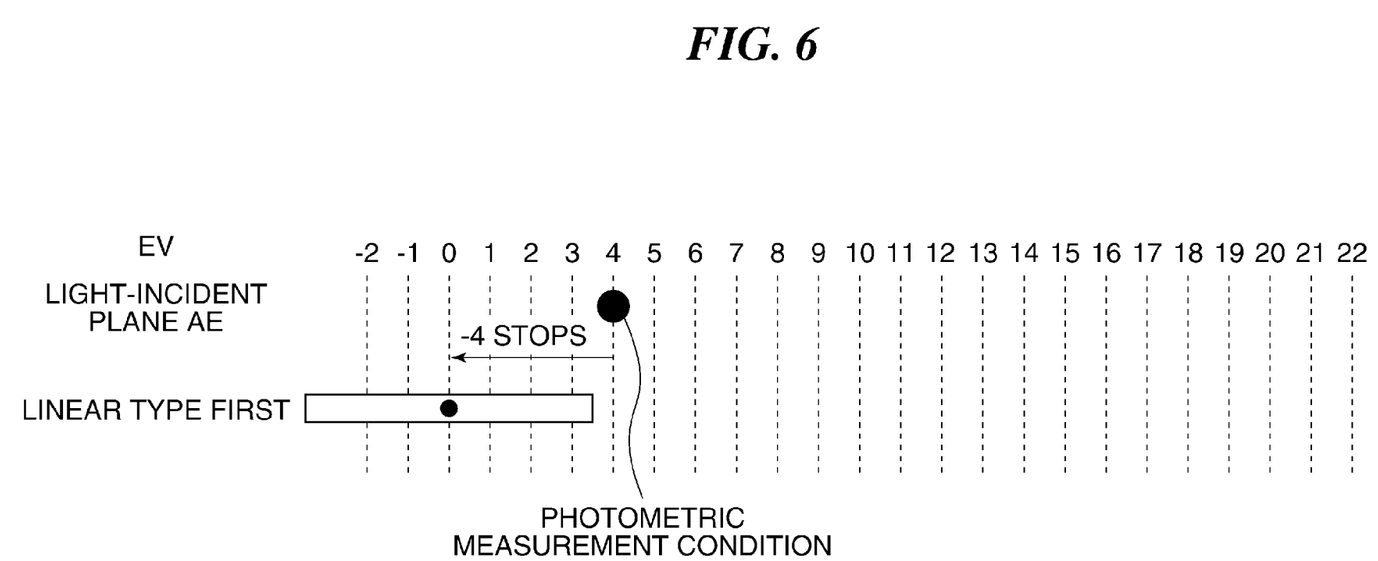
FIG. 6 is a diagram useful in explaining a photometric measurement operation which is performed in a case where a final output of a photometric measurement value from the image pickup device at the time of light-incident plane AE is under an prescribed value, and a photometric measurement condition is a low brightness side.

FIG. 6 is a diagram useful in explaining a photometric measurement operation in a case where a final output of a photometric measurement value from the image pickup device 103 at the time of light-incident plane AE is under the prescribed value, and a photometric measurement condition is a low brightness side. In this case, a subject brightness is on a lower brightness side than the photometric measurement condition, and a range thereof is limited.

In the present embodiment, in a case where correct exposure is obtained when the photometric measurement condition for light-incident plane AE is EV 4, and an output of a photometric measurement value from the image pickup device 103 is under the prescribed value, it is assumed that the image pickup device 103 has a dynamic range of about six stops, and hence a subject brightness is estimated to be equal to or smaller than EV 1. Therefore, in a photometric measurement operation using the photometric sensor 108, a photometric measurement condition is set to be four stops lower than that at the time of light-incident plane AE, and one photometric measurement is performed, so that a range up to EV −2 is satisfactorily covered.

In the step S211, the ICPU 112 performs two photometric measurement operations using the photometric sensor 108 over a lower brightness range than the photometric measurement condition for light-incident plane AE and terminates the present process.

Figure 7:
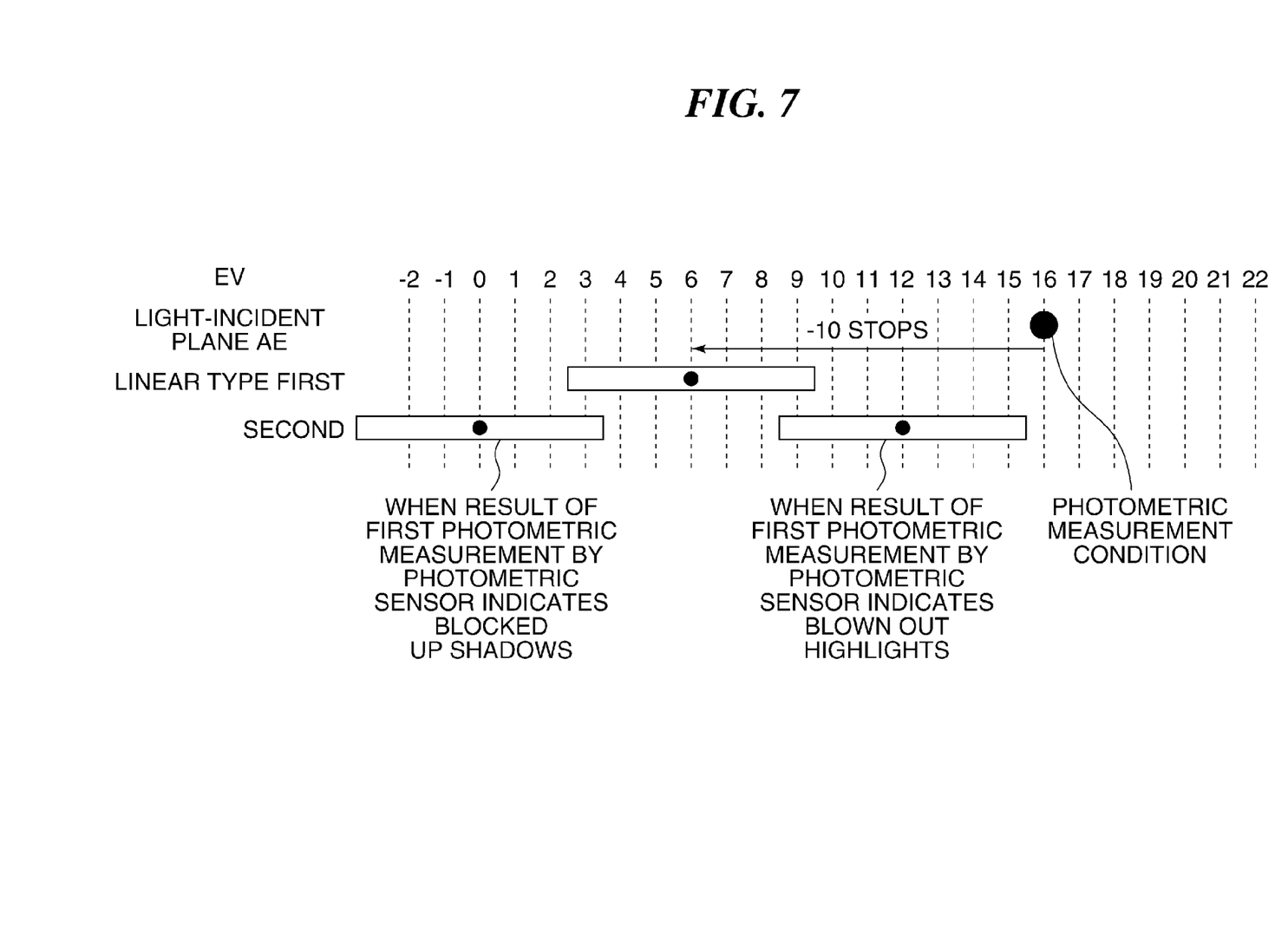
FIG. 7 is a diagram useful in explaining a photometric measurement operation which is performed in a case where a final output of a photometric measurement value from the image pickup device at the time of light-incident plane AE is under an prescribed value, and a photometric measurement condition is a high brightness side.

FIG. 7 is a diagram useful in explaining a photometric measurement operation in a case where a final output of a photometric measurement value from the image pickup device 103 is under the prescribed value, and a photometric measurement condition is a high brightness side. In this case, as shown in FIG. 7, a subject brightness is lower than the photometric measurement condition for light-incident plane AE. Therefore, in photometric measurement using the photometric sensor 108, a first photometric measurement is performed first under a photometric measurement condition that is set to be ten stops lower than that at the time of light-incident plane AE, and then, a second photometric measurement is performed based on a result of the first photometric measurement to measure a brightness of a subject.

As described hereinabove, in the present embodiment, when a photometric measurement operation using the linear photometric sensor 108 is started, the number of photometric measurements is changed according to the presence or absence of light-incident plane AE and a result of photometric measurement obtained by light-incident plane AE, and a subject brightness is measured.

As a result, when there has been a shift from a photometric measurement operation using the image pickup device 103 to a photometric measurement operation using the photometric sensor 108, the time period required for photometric measurement is shortened, and further, an accurate photometric measurement value is obtained. This is useful, for example, when a mirror mechanism is flipped down once at the time of Live View shooting to perform phase-difference AF based on information on a result of measurement of a light source by the photometric sensor 108, or when flash is controlled using information on photometric measurement performed by the photometric sensor 108.

It should be noted that although in the present embodiment, a sensor capable of converting output characteristics only in a linear fashion with respect to the amount of incident light is adopted as the photometric sensor 108, the photometric sensor 108 is not limited to this. For example, a sensor capable of switching the mode of converting an electric signal with respect to the amount of incident light between a linear mode and a logarithmic mode may be adopted as the photometric sensor 108.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-117390, filed Jun. 10, 2015, which is hereby incorporated by reference herein in its entirety.

What is claimed is:

1. An image pickup apparatus comprising:
   an image pickup device configured to perform photoelectric conversion of a subject image formed through a shooting optical system of a lens barrel and output an electric signal;
   a linear photometric sensor which is a different sensor from said image pickup device and is configured to measure an amount of light;
   at least one processor or circuit executing a program stored in a memory to perform operations of the following units:
   a photometric measurement control unit configured to control a first photometric measurement operation based on a result of charge accumulation of said image pickup device and a second photometric measurement operation based on a result of charge accumulation of said photometric sensor; and
   a judgment unit configured to judge whether there has been a shift from the first photometric measurement operation to the second photometric measurement operation,
   wherein, when said judgment unit judges that there has been no shift from the first photometric measurement operation to the second photometric measurement operation, said photometric measurement control unit performs the first photometric measurement operation for a plurality of times, and when said judgment unit judges that there has been a shift from the first photometric measurement operation to the second photometric measurement operation, said photometric measurement control unit performs the second photometric measurement operation for a smaller number of times than that of the first photometric measurement operation according to a result of the first photometric measurement operation.

2. The image pickup apparatus according to claim 1, further comprising a mirror mechanism configured to, at the time of observation through a viewfinder, enter a shooting optical path and reflect a bundle of rays, which has passed through the shooting optical system, to a viewfinder optical system, and at the time of shooting, retract from the shooting optical path and guide a bundle of rays, which has passed through the shooting optical system, to said image pickup device,
   wherein said photometric measurement control unit controls the second photometric measurement operation on light that falls upon said photometric sensor through the viewfinder optical system in a state where the mirror mechanism has entered the shooting optical path with a mirror flipped down.

3. The image pickup apparatus according to claim 2, wherein said photometric measurement control unit controls the first photometric measurement operation on a subject image formed on said image pickup device when the mirror mechanism retracts from the shooting optical path with the mirror flipped up at the time of Live View shooting.

4. The image pickup apparatus according to claim 1, wherein when said judgment unit judges that there has been a shift from the first photometric measurement operation to the second photometric measurement operation, and a final output of a photometric measurement value from said image pickup device is within a dynamic range of said image pickup device, said photometric measurement control unit performs the second photometric measurement operation for one time based on the photometric measurement value.

5. A control method for an image pickup apparatus including an image pickup device that performs photoelectric conversion of a subject image formed through a shooting optical system of a lens barrel and outputs an electric signal, and a linear photometric sensor which is a different sensor from said image pickup device and is configured to measure an amount of light, the method comprising:
   a photometric measurement control step of controlling a first photometric measurement operation based on a result of charge accumulation of the image pickup device and a second photometric measurement operation based on a result of charge accumulation of the photometric sensor; and
   a judgment step of judging whether there has been a shift from the first photometric measurement operation to the second photometric measurement operation,
   wherein, when it is judged in the judgment step that there has been no shift from the first photometric measurement operation to the second photometric measurement operation, performing the first photometric measurement control operation for a plurality of times, and when it is judged in the judgment step that there has been a shift from the first photometric measurement operation to the second photometric measurement operation, performing the second photometric measurement operation for a smaller number of times than that of the first photometric measurement operation according to a result of the first photometric measurement operation.

6. A non-transitory computer-readable storage medium storing a program for causing a computer to execute a control method for an image pickup apparatus including an image pickup device that performs photoelectric conversion of a subject image formed through a shooting optical system of a lens barrel and outputs an electric signal, and a linear photometric sensor which is a different sensor from said image pickup device and is configured to measure an amount of light, the method comprising:

a photometric measurement control step of controlling a first photometric measurement operation based on a result of charge accumulation of the image pickup device and a second photometric measurement operation based on a result of charge accumulation of the photometric sensor; and a judgment step of judging whether there has been a shift from the first photometric measurement operation to the second photometric measurement operation, wherein, when it is judged in the judgment step that there has been no shift from the first photometric measurement operation to the second photometric measurement operation, performing the first photometric measurement control operation for a plurality of times, and when it is judged in the judgment step that there has been a shift from the first photometric measurement operation to the second photometric measurement operation, performing the second photometric measurement operation for a smaller number of times than that of the first photometric measurement operation according to a result of the first photometric measurement operation.

7. An image pickup apparatus comprising:

an image pickup device configured to perform photoelectric conversion of a subject image and output an electric signal;

a linear photometric sensor, which is a different sensor from said image pickup device, and is configured to measure an amount of light;

at least one processor or circuit executing a program stored in a memory to perform operations of the following units:

a photometric measurement control unit, configured to control a first photometric measurement operation based on charge accumulation of said image pickup device, and a second photometric measurement operation based on charge accumulation of said photometric sensor; and at least one processor or circuit configured to perform the operations of the following unit:

a judgment unit configured to judge whether the second photometric measurement operation is performed for the first time after a power of the image pickup apparatus has been turned on, or the second photometric measurement operation is performed after the first photometric measurement operation which has been performed after the power of the image pickup apparatus was turned on, wherein, when said judgment unit judges that the second photometric measurement operation is performed for the first time after the power of the image pickup apparatus has been turned on, said photometric measurement control unit performs the first photometric measurement operation for a plurality of times, and wherein, when said judgment unit judges that the second photometric measurement operation is performed after the first photometric measurement operation which has been performed after the power of the image pickup apparatus was turned on, said photometric measurement control unit performs the second photometric measurement operation for a smaller number of times than that of the first photometric measurement operation.

8. A control method for an image pickup apparatus comprising:

a photoelectric conversion step of converting a subject image to an output electric signal;

measuring an amount of light by a linear photometric sensor, which is a different sensor from said image pickup device;

a photometric measurement control step of controlling a first photometric measurement operation based on charge accumulation of said image pickup device, and controlling a second photometric measurement operation based on charge accumulation of said photometric sensor;

a judgment step of judging whether the second photometric measurement operation is performed for the first time after a power of the image pickup apparatus has been turned on, or the second photometric measurement operation is performed after the first photometric measurement operation which has been performed after the power of the image pickup apparatus was turned on, wherein, when it is judged in the judgment step that the second photometric measurement operation is performed for the first time after the power of the image pickup apparatus has been turned on, performing the first photometric measurement operation for a plurality of times, and wherein, when it is judged in the judgment step that the second photometric measurement operation is performed after the first photometric measurement operation which has been performed after the power of the image pickup apparatus was turned on, performing the second photometric measurement operation for a smaller number of times than that of the first photometric measurement operation.

9. A non-transitory computer-readable storage medium storing a program for causing a computer to execute a control method for an image pickup apparatus having am image pickup device configured to perform photoelectric conversion of a subject image and output an electric signal and a linear photometric sensor, which is a different sensor from said image pickup device, and is configured to measure an amount of light, the control method comprising:

a photoelectric conversion step of converting a subject image to an output electric signal;

measuring an amount of light by a linear photometric sensor, which is a different sensor from said image pickup device;

a photometric measurement control step of controlling a first photometric measurement operation based on charge accumulation of said image pickup device, and controlling a second photometric measurement operation based on charge accumulation of said photometric sensor;

a judgment step of judging whether the second photometric measurement operation is performed for the first time after a power of the image pickup apparatus has been turned on, or the second photometric measurement operation is performed after the first photometric measurement operation which has been performed after the power of the image pickup apparatus was turned on, wherein, when it is judged in the judgment step that the second photometric measurement operation is performed for the first time after the power of the image pickup apparatus has been turned on, performing the first photometric measurement operation for a plurality of times, and wherein, when it is judged in the judgment step that the second photometric measurement operation is performed after the first photometric measurement operation which has been performed after the power of the image pickup apparatus was turned on, performing the second photometric measurement operation for a smaller number of times than that of the first photometric measurement operation.

* * * * *